US009955408B2

United States Patent
Novlan et al.

(10) Patent No.: US 9,955,408 B2
(45) Date of Patent: Apr. 24, 2018

(54) NETWORK-ASSISTED MULTI-CELL DEVICE DISCOVERY PROTOCOL FOR DEVICE-TO-DEVICE COMMUNICATIONS

(71) Applicant: Samsung Electronics Co., Ltd., Suwon-si, Gyeonggi-do (KR)

(72) Inventors: Thomas David Novlan, Dallas, TX (US); Young Han Nam, Plano, TX (US); Boon Loong Ng, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 14/176,919

(22) Filed: Feb. 10, 2014

(65) Prior Publication Data

US 2014/0242963 A1    Aug. 28, 2014

Related U.S. Application Data

(60) Provisional application No. 61/768,226, filed on Feb. 22, 2013.

(51) Int. Cl.
*H04B 7/00* (2006.01)
*H04W 48/16* (2009.01)
*H04W 8/00* (2009.01)

(52) U.S. Cl.
CPC ........... *H04W 48/16* (2013.01); *H04W 8/005* (2013.01)

(58) Field of Classification Search
CPC ..... H04W 84/18; H04W 76/02; H04W 48/16; H04W 8/005; H04W 4/08; H04M 1/7253; H04M 2250/02; H04L 67/1044

(Continued)

(56) References Cited

U.S. PATENT DOCUMENTS

2008/0002647 A1* 1/2008 Laroia ................ H04W 40/244
                                                    370/338
2010/0165882 A1    7/2010 Palanki et al.
(Continued)

FOREIGN PATENT DOCUMENTS

| CN | 102859925 A | 1/2013 |
|---|---|---|
| EP | 2187553 A1 | 5/2010 |
| KR | 10-2011-0102935 A | 9/2011 |
| WO | WO 2011/161560 A1 | 12/2011 |
| WO | 2013025040 A2 | 2/2013 |

(Continued)

OTHER PUBLICATIONS

"LTE; Evolved Universal Terrestrial Radio Access (E-UTRA); Physical Channels and Modulation"; ETSI; 3GPP TS 36.211, Version 10.1.0, Release 10; Apr. 2011; 105 pp.

(Continued)

*Primary Examiner* — Huy C Ho

(57) ABSTRACT

A method includes determining, at a first eNodeB (eNB) associated with a first cell of a network, that a first user equipment (UE) is to engage in a device discovery process. The method also includes coordinating parameters of the device discovery process with a second eNB. The second eNB is associated with a second cell of the network and with a second UE. The parameters define one or more resources to be used in the first and second cells during the device discovery process. The method further includes communicating at least some of the parameters to the first UE. The device discovery process includes a process in which the first UE identifies one or more other UEs with which the first UE is able to engage in device-to-device communications.

20 Claims, 6 Drawing Sheets

(58) Field of Classification Search
USPC .......................................................... 455/41.1
See application file for complete search history.

(56) References Cited

U.S. PATENT DOCUMENTS

| | | | |
|---|---|---|---|
| 2011/0258313 A1 | 10/2011 | Mallik et al. | |
| 2011/0268101 A1 | 11/2011 | Wang et al. | |
| 2012/0044815 A1 | 2/2012 | Geirhofer et al. | |
| 2012/0163235 A1 | 6/2012 | Ho et al. | |
| 2014/0274066 A1* | 9/2014 | Fodor .................... | H04W 36/08 455/437 |
| 2015/0063095 A1* | 3/2015 | Deng .................... | H04W 8/005 370/221 |
| 2015/0071189 A1 | 3/2015 | Park et al. | |

FOREIGN PATENT DOCUMENTS

| | | | |
|---|---|---|---|
| WO | 2013108219 A1 | 7/2013 |
| WO | 2014109595 A1 | 7/2014 |
| WO | 2014124608 A1 | 8/2014 |
| WO | 2015020448 A1 | 2/2015 |

OTHER PUBLICATIONS

"LTE; Evolved Universal Terrestrial Radio Access (E-UTRA); Multiplexing and Channel Coding"; ETSI; 3GPP TS 36.212, Version 10.1.0, Release 10; Apr. 2011; 78 pp.
"LTE; Evolved Universal Terrestrial Radio Access (E-UTRA); Physical Layer Procedures"; ETSI; 3GPP TS 36.213, Version 10.1.0, Release 10; Apr. 2011; 117 pp.
"3rd Generation Partnership Project"; Technical Specificaiton Group SA; Feasibility Study for Proximity Services (ProSe); 3GPP; Release 12; Aug. 2012; 33 pp.
"Study on LTE Device to Device Proximity Services"; Qualcomm Inc.; 3GPP TSG RAN Meeting #58; 6 pp.
"LTE; Evolved Universal Terrestrial Radio Access (E-UTRA); Radio Resource Control (RRC); Protocol Specification"; ETSI; 3GPP TS 36.331, Version 11.1.0, Release 11; 329 pp.
Internatioanl Search Report dated May 27, 2014 in connection with International Patent Application No. PCT/KR2014/001400; 4 pp.
Written Opinion dated May 27, 2014 in connection with International Patent Application No. PCT/KR2014/001400; 3 pp.
Fodor, et al.; "Design Aspects of Network Assisted Device-toDevice Communications"; IEEE Comunications Magazine; Mar. 2012; pp. 170-177.
3GPP TSG RAN WG1 Meeting #72; "On LTE D2D Methodologies and Metrics"; Nokia, Nokia Siemens Networks; St., Julian's malta, Jan. 28-Feb. 1, 2013; (R1-130501); 4 pp.
European Patent Office, "Supplementary European Search Report," Application No. 14754613,9-1854, dated Nov. 16, 2016, 16 pages, publisher EPO, Munich, Germany.
State Intellectual Property Office of the People's Republic of China First Office Action, dated Jan. 17, 2018, regarding Application No. 201480017647.3, 16 pages.

\* cited by examiner

NETWORK-ASSISTED MULTI-CELL DEVICE DISCOVERY PROTOCOL FOR DEVICE-TO-DEVICE COMMUNICATIONS

CROSS-REFERENCE TO RELATED APPLICATION AND CLAIM OF PRIORITY

This application claims priority under 35 U.S.C. § 119(e) to U.S. Provisional Patent Application No. 61/768,226 filed on Feb. 22, 2013. This provisional patent application is hereby incorporated by reference in its entirety.

TECHNICAL FIELD

This disclosure relates generally to wireless communication systems. More specifically, this disclosure relates to a network-assisted multi-cell device discovery protocol for device-to-device (D2D) communications.

BACKGROUND

Traditionally, cellular communication networks have been designed to establish wireless communication links between mobile devices and fixed communication infrastructure components (such as base stations or access points) that serve users in a wide or local geographic range. However, a wireless network can also be implemented utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices.

In hybrid networks that include D2D-enabled devices, device discovery is typically performed periodically to allow devices to discover and identify neighboring devices. This is often accomplished using a discovery message signaling protocol. For example, a specified device may transmit a discovery message, and other devices can receive the discovery message and use information in the discovery message to establish communication links with the specified device.

SUMMARY

This disclosure provides a network-assisted multi-cell device discovery protocol for device-to-device (D2D) communications.

In a first embodiment, a method includes determining, at a first eNodeB (eNB) associated with a first cell of a network, that a first user equipment (UE) is to engage in a device discovery process. The method also includes coordinating parameters of the device discovery process with a second eNB. The second eNB is associated with a second cell of the network and with a second UE. The parameters define one or more resources to be used in the first and second cells during the device discovery process. The method further includes communicating at least some of the parameters to the first UE. The device discovery process includes a process in which the first UE identifies one or more other UEs with which the first UE is able to engage in device-to-device communications.

In a second embodiment, an apparatus includes a first eNB configured to be associated with a first cell of a network. The first eNB includes at least one transceiver configured to communicate with (i) a first UE that is to engage in a device discovery process and (ii) a second eNB that is associated with a second cell of the network and with a second UE. The first eNB also includes at least one processing device configured to coordinate parameters of the device discovery process with the second eNB. The parameters define one or more resources to be used in the first and second cells during the device discovery process. The at least one processing device is also configured to initiate communication of at least some of the parameters to the first UE via the at least one transceiver.

In a third embodiment, an apparatus includes a first UE configured to communicate with a first eNB associated with a first cell of a network. The first UE includes at least one transceiver configured to receive one or more parameters associated with a device discovery process from the first eNB. The one or more parameters define one or more resources to be used during the device discovery process in the first cell and in a second cell associated with a second eNB. The first UE also includes at least one processing device configured to identify one or more other UEs based on communications received via the at least one transceiver during the device discovery process.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that, in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

Figure 1:
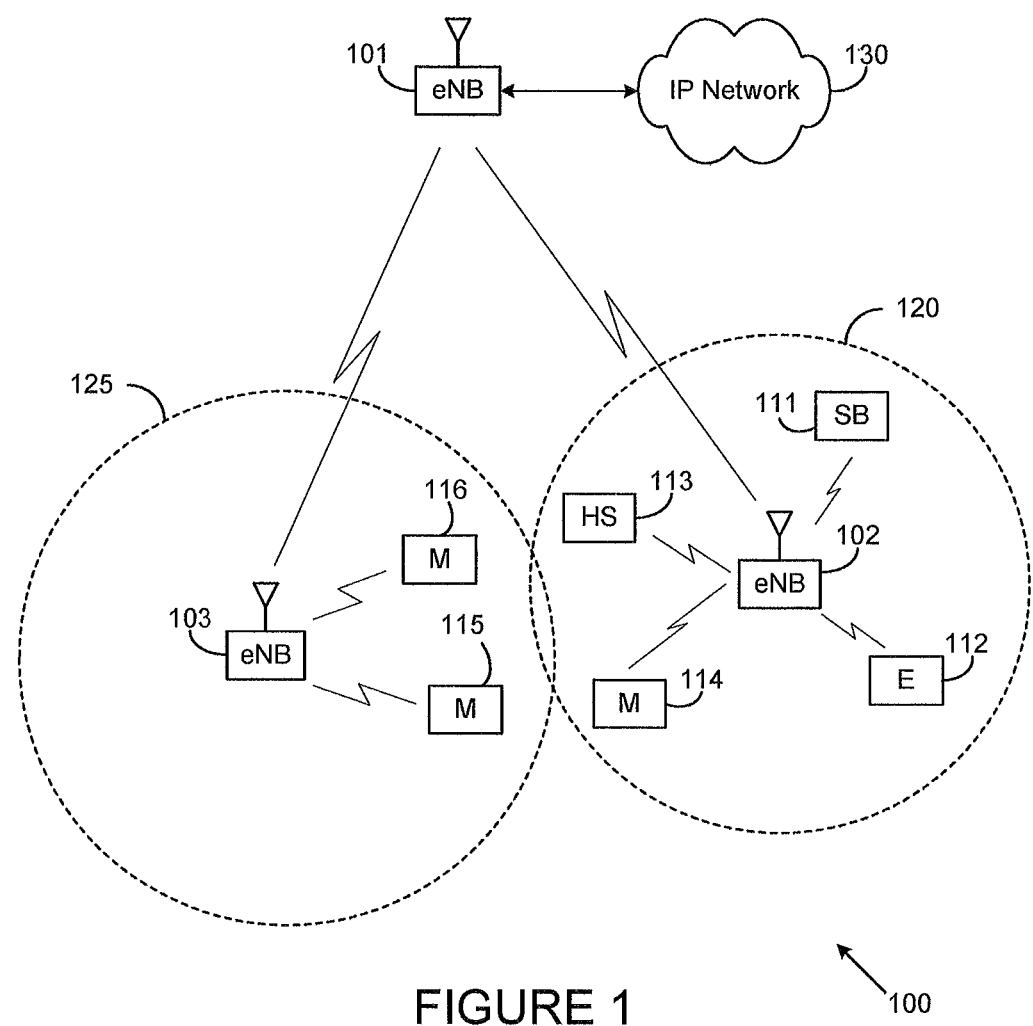
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area of the eNB 102. The first plurality of UEs includes a UE 111, which may be located in a small business (SB); a UE 112, which may be located in an enterprise (E); a UE 113, which may be located in a WiFi hotspot (HS); and a UE 114, which may be a mobile device (M) like a cell phone, wireless laptop, wireless PDA, or the like. The eNB 103 provides wireless broadband access to the network 130 for a second plurality of UEs within a coverage area of the eNB 103. The second plurality of UEs includes a UE 115 and a UE 116, which may be mobile devices (M). In some embodiments, one or more of the eNBs 101-103 may communicate with each other and with the UEs 111-116 using 5G, LTE, LTE-A, WiMAX, or other advanced wireless communication techniques.

Various UEs 111-116 could also support device-to-device (D2D) communications in which the UEs communicate directly with one another. In this manner, the network 100 represents a hybrid communication network that allows a UE to connect both to a fixed infrastructure component (such as an eNB 101-103) and to other D2D-enabled UEs.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas of two cells 120 and 125, which are shown as approximately circular for the purposes of illustration and explanation only. It should be clearly understood that the cells 120 and 125 associated with the eNBs 102-103 may have other shapes, including irregular shapes, depending upon the configuration of the eNBs and variations in the radio environment associated with natural and man-made obstructions.

As described in more detail below, components of the wireless network 100 (such as the eNBs 101-103 and the UEs 111-116) support a network-assisted multi-cell device discovery protocol. Among other things, the device discovery protocol allows UEs 111-116 to discover one another and engage in D2D communications without interfering with normal operations of the eNBs 101-103 and with devices connected to the eNBs 101-103.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
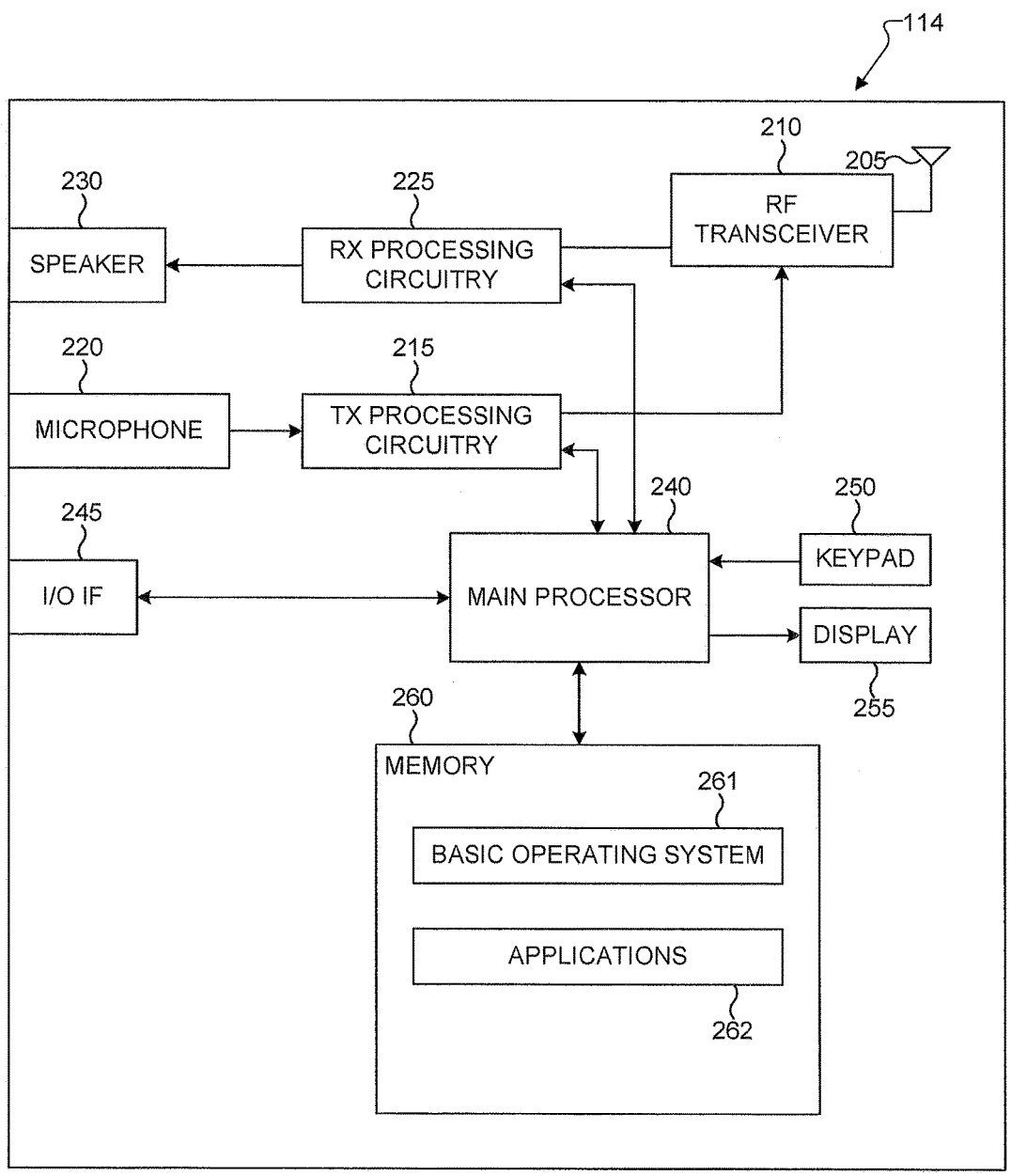
FIG. 2 illustrates an example user equipment (UE) according to this disclosure.

FIG. 2 illustrates an example UE 114 according to this disclosure. The embodiment of the UE 114 illustrated in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touchscreen.

The memory 260 is coupled to the main processor 240. Part of the memory 260 could include a random access memory (RAM), and another part of the memory 260 could include a Flash memory or other read-only memory (ROM).

As noted above, the UE 114 could operate in a hybrid communication network in which the UE 114 communicates with eNBs 101-103 and with other UEs. As described in more detail below, the UE 114 supports a network-assisted multi-cell device discovery protocol that, with the assistance of the eNBs, allows the UE 114 to discover neighboring UEs and to establish communication links with the neighboring UEs (even UEs in different cells).

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smartphone, UEs could be configured to operate as other types of mobile or stationary devices. In addition, various components in FIG. 2 could be replicated, such as when different RF components are used to communicate with the eNBs 101-103 and with other UEs.

Figure 3:
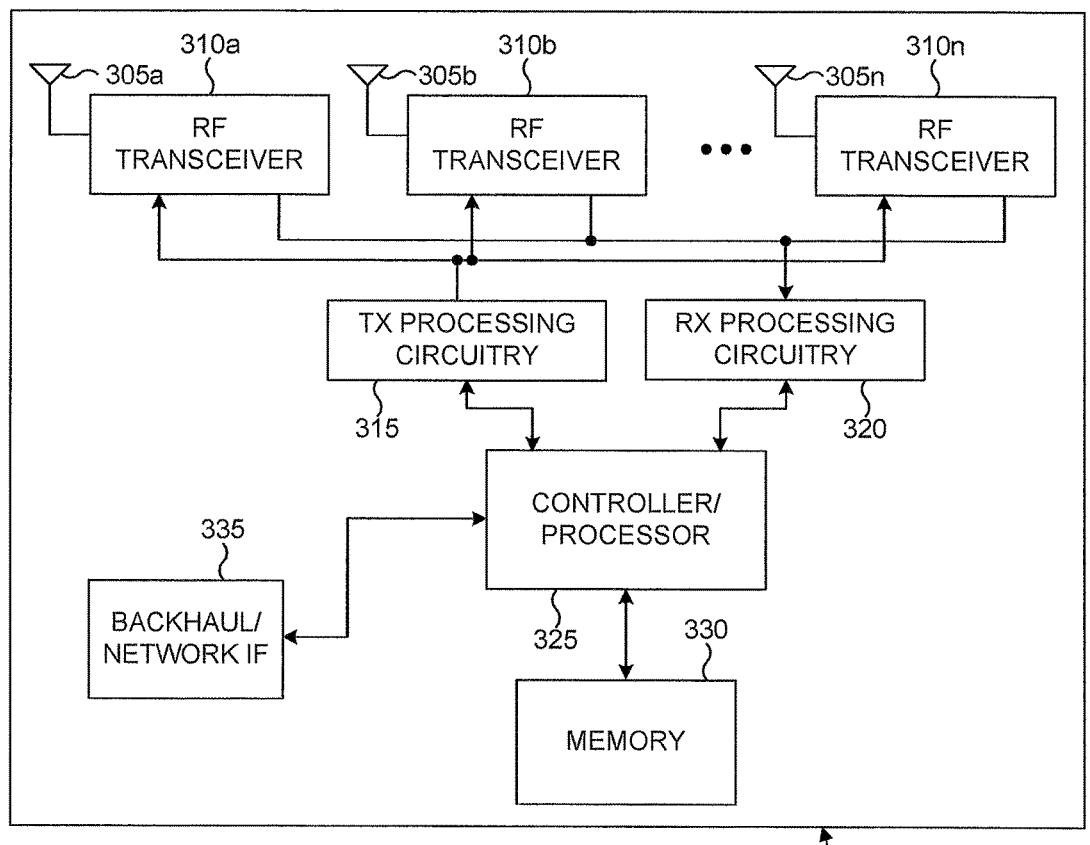
FIG. 3 illustrates an example eNodeB (eNB) according to this disclosure.

FIG. 3 illustrates an example eNB 102 according to this disclosure. The embodiment of the eNB 102 illustrated in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As noted above, the eNB 102 could operate in a hybrid communication network in which UEs communicate with the eNBs 101-103 and with other UEs. As described in more detail below, the eNB 102 supports a network-assisted multi-cell device discovery protocol that, with the assistance of the eNBs 101-103, allows the UEs to discover neighboring UEs and to establish communication links with the neighboring UEs (even UEs in different cells).

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver). Also, various components in FIG. 3 could be combined, further subdivided, or omitted and additional components could be added according to particular needs.

Figure 4:
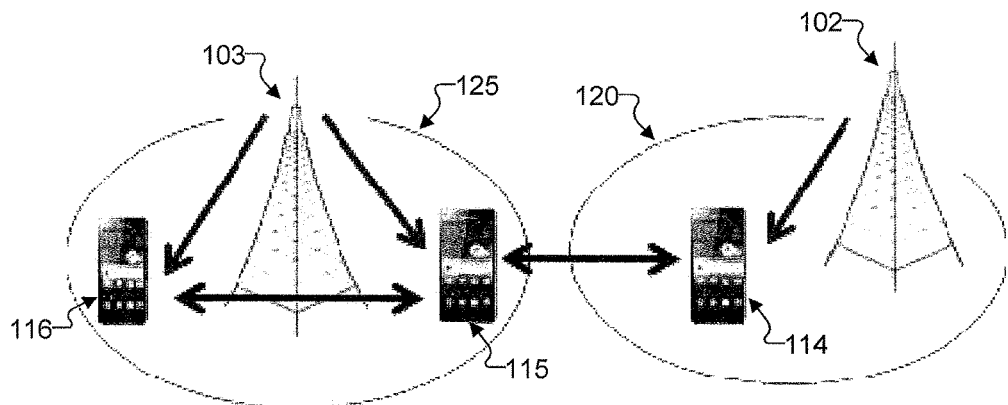
FIG. 4 illustrates example single-cell and multi-cell device-to-device (D2D) communications according to this disclosure.

FIG. 4 illustrates example single-cell and multi-cell D2D communications according to this disclosure. In the single-cell example, the eNB 103 in the cell 125 communicates with multiple UEs 115-116. The UEs 115-116 can engage in wireless communications with the eNB 103, and the UEs 115-116 can also engage in D2D communications with each other.

In the multi-cell example, the eNB 102 in the cell 120 communicates with the UE 114. The UEs 114-115 can engage in wireless communications with their respective eNBs 102-103, and the UEs 114-115 can also engage in D2D communications with each other.

This disclosure describes various embodiments of a device discovery protocol to support D2D communications between UEs in one or multiple cells. The device discovery protocol is referred to as "network-assisted" in that the eNBs associated with the cells can assist in the discovery process. In the following description, it may be assumed that the eNBs and UEs are operating in a hybrid LTE-Advanced cellular network, where the UEs have the ability to communicate with the network via UE-to-eNB links and with each other via UE-to-UE links. The network assists in the device discovery process through an iterative protocol involving control messaging, link quality measurement, and discovery messaging between the UEs and between the network and the respective UEs. Of course, the device discovery protocol described here could be used in any other suitable network.

Additionally, the varying nature of a radio propagation environment implies that the device discovery protocol may have different probabilities of failure depending on the network scenario. For certain use cases (such as public safety), device discovery may be more critical than in some consumer-oriented use cases. As a result, some embodiments of the device discovery protocol introduce discovery priority, where different resource configurations (such as bandwidth, transmit power, and/or discovery length configurations) are mapped to different priority levels. The different priority levels could be configured by the network or by a UE.

The discovery process may be initiated by a UE or by the network (including an eNB or a higher-level core network source). In many scenarios, D2D-enabled UEs that are to engage in discovery are located within the coverage area of a single eNB (such as in cell 125 of FIG. 4). However, UEs at the edges of their serving eNBs' coverage areas may be able to communicate with one another via D2D links, as well (such as between cells 120-125 of FIG. 4). Having a level of coordination in the protocol framework for multi-cell device discovery is beneficial since it allows efficient and interference-free management of scenarios where some UEs are within coverage areas of different eNBs.

One motivation for network-initiated device discovery could arise if an eNB determines or would like to determine whether a first UE and a second UE are within range of a direct D2D communication link. It would be beneficial (such as in terms of latency, throughput, or reducing network congestion) for the UEs to utilize a D2D link to communicate, rather than routing their communications through UE-eNB links.

Figure 5:
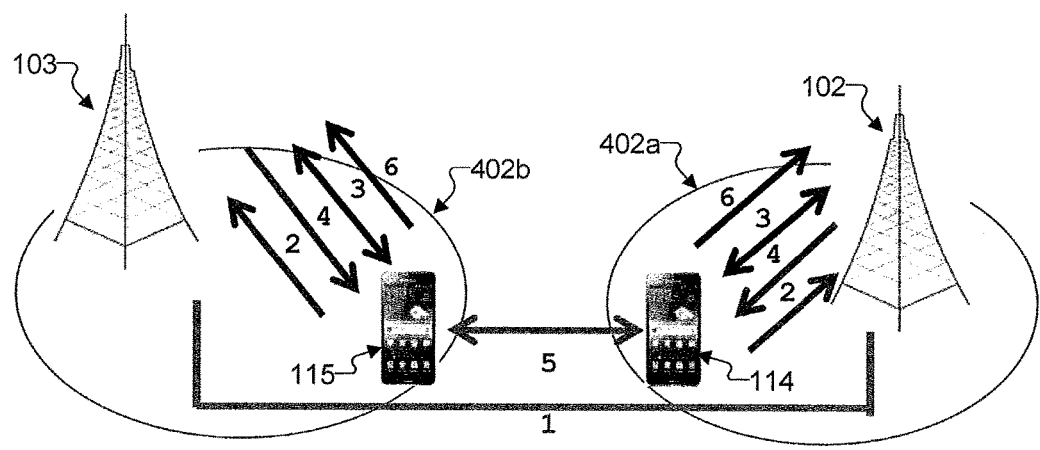
FIG. 5 illustrates an example network-assisted multi-cell device discovery protocol for D2D communications according to this disclosure.

FIG. 5 illustrates an example network-assisted multi-cell device discovery protocol for D2D communications according to this disclosure. This example considers the network-assisted device discovery process when the UEs 114-115 that are to engage in D2D communications are within the communication range of the network but are served by different eNBs 102-103. Note that while two UEs 114-115 are shown in FIG. 5, the UEs 114-115 could engage in D2D communications with other UEs in the same cells 120-125 or in different cells. The following description can therefore be generalized to consider discovery between a plurality of UEs served by multiple eNBs.

The protocol for multi-cell network-assisted device discovery is divided into six main steps as shown in FIG. 5:
(1) discovery parameter coordination;
(2) discovery request/initiation;
(3) discovery feasibility measurement;
(4) discovery resource configuration and signaling;
(5) D2D discovery protocol; and
(6) discovery report messaging.

Step (1) occurs between the eNBs 102-103 serving the UEs 114-115. The remaining steps (2)-(6) occur between each UE 114-115 and its respective eNB 102-103. A detailed description of each step in the protocol is provided below.

Discovery Parameter Coordination

In step (1) of FIG. 5, D2D discovery parameters are coordinated between the eNBs 102-103. When discovery periods of two cells 120-125 occur in the same set of time-frequency resources, one source of interference to the D2D discovery process can be from the discovery signals of other UEs. Also, cellular communications in one cell 120, 125 may interfere with discovery in another cell 125, 120. These different types of interference may result in worse performance in both discovery and cellular communications.

The D2D discovery parameter exchange in step (1) between the eNBs 102-103 may include information about one or more sets of time-frequency resources (denoted as one or more "discovery resource sets") used for D2D discovery periods. For example, when two sets (denoted "discovery resource set #1" and "discovery resource set #2") are configured, the network can differentiate discovery parameters based on the relative priority or range (such as discovery resource set #1 for local devices and discovery resource set #2 for wide-area discovery). Additionally, an eNB may configure a UE with one or more discovery resource sets on a cell-specific or UE-specific basis. The information exchange for the discovery resource sets may take place over an eNB-eNB interface, such as an X2 or S1 interface used in LTE.

Figure 6:
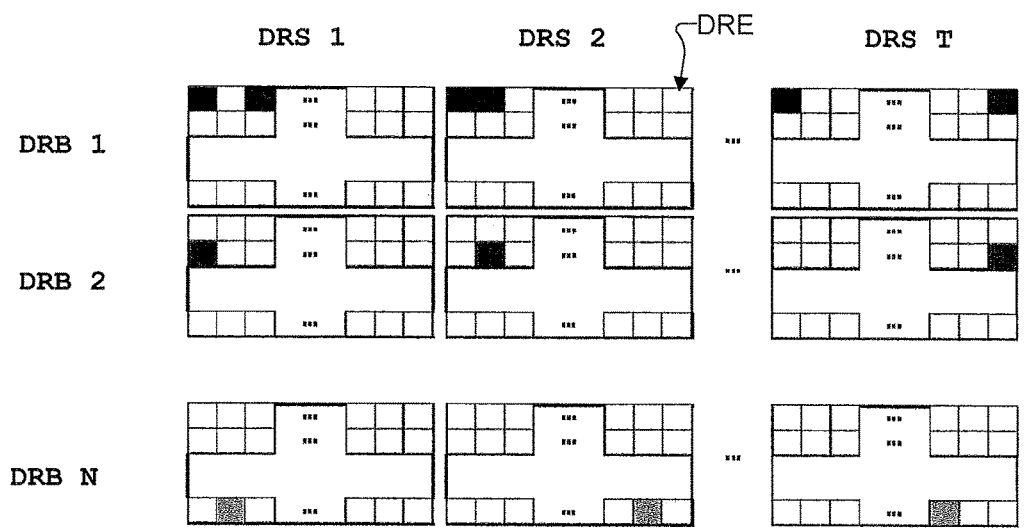
FIG. 6 illustrates example discovery resource block (DRB) and discovery resource element (DRE) configurations for a discovery period according to this disclosure.

In some embodiments, the time-frequency resources utilized for a given discovery period may be divided into N discovery resource blocks (DRB) containing multiple discovery resource elements (DRE) transmitted in T dedicated discovery resource slots (DRS). In one example, a DRB corresponds to a physical resource block (PRB) pair and a DRS corresponds to a subframe as defined in the 3GPP TS 36.211 v10.1.0 standard entitled "E-UTRA, Physical channels and modulation." FIG. 6 illustrates example DRB and DRE configurations for a discovery period according to this disclosure.

Frequency resources configured for a discovery resource set may be differentiated in various ways. For example, frequency resources may be differentiated by carrier number or carrier type (such as NCT or Legacy carrier), placement in downlink/uplink (DL/UL) bandwidth (for frequency division duplexing) or subframes (for time division duplexing), or subframe type (such as MBSFN or non-MBSFN subframes). As a particular example, discovery may be restricted to the UL bandwidth, or discovery may only be allowed in MBSFN DL subframes.

Note that a discovery resource set configuration may be carrier-specific, in which case the carrier frequency (such as carrierFreq) can be indicated along with the configuration parameters. For example, carrier #1 at 700 MHz can utilize discovery resource set #1, and carrier #2 at 3.5 GHz can utilize discovery resource set #2.

Discovery resource set configurations may also be different depending on whether DL or UL resources are utilized for discovery. In that case, an indication whether to use UL or DL resources can be included in the discovery parameters (see Table 2 below as an example). As a particular example, an information element can be defined for the UL/DL indication, such as DiscoveryResourceULDL, that is set to either UL or DL. When DiscoveryResourceULDL is set to UL, UL resources are configured. When DiscoveryResourceULDL is set to DL, DL resources are configured.

Figure 7A:
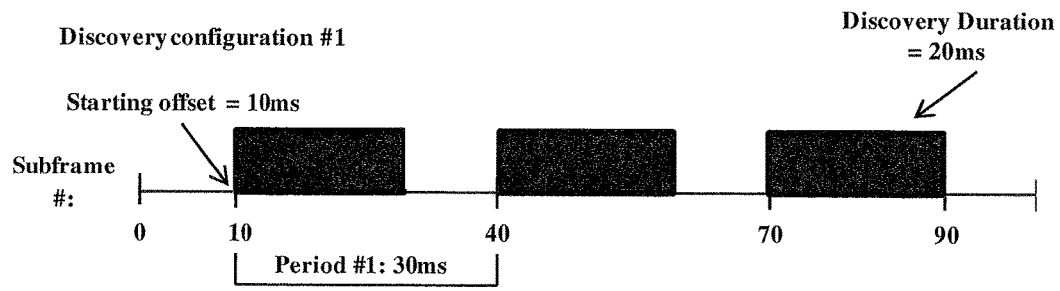
FIGS. 7A and 7B illustrate example discovery periods configured using discovery configuration parameters according to this disclosure.
Figure 7B:
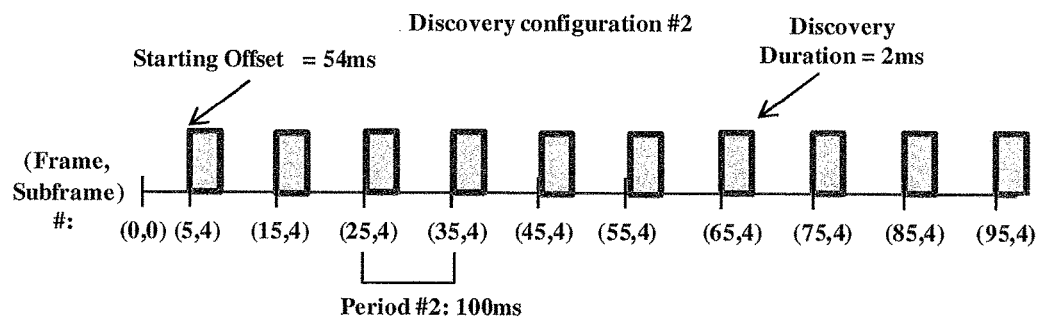

In some embodiments, for discovery parameter coordination in step (1) of FIG. 5, one, some, or all of the following parameters can be exchanged between the eNBs:
1. Discovery frame and subframe indices and period
2. Discovery time-frequency resources within a serving cell
3. Discovery duration
4. Discovery configuration mapping tables
5. Discovery ID range
6. Carrier frequency (carrierFreq) for the discovery time-frequency resources
7. DiscoveryResourceULDL Fundamentally, the discovery configuration specifies the timing information (such as period, duration, and starting offset) and frequency information (such as PRB numbers) to map D2D discovery parameters to an LTE time/frequency grid. FIGS. 7A and 7B illustrate example discovery periods configured using discovery configuration parameters according to this disclosure.

The "frame and subframe indices and period" parameter allows the eNBs 102-103 participating in the discovery parameter exchange to align the timing of the discovery periods by providing a common reference of the discovery periods within the overall LTE frame structure. In some embodiments, the frame and/or subframe indices are indicated for every discovery period within a configuration window (such as 100 frames), which represents the period for which the D2D discovery configuration is considered to be valid.

In other embodiments, the frame and/or subframe indices utilized for discovery by a given discovery configuration are indicated via a bitmap as part of a Discovery Parameter Configuration Message (DPCM). If the number of discovery periods is high relative to the size of the configuration window, it may be beneficial to indicate only the starting frame or subframe utilized by the first discovery period of a given discovery configuration. The duration of the discovery period and the time to the start of the next discovery period can then be indicated.

In yet other embodiments, the starting frame and/or subframe indices utilized for discovery by a given discovery configuration are indicated as part of the DPCM, along with a corresponding period duration and time between the start of consecutive discovery periods. In this case, the starting instant of the discovery period may be indicated by giving the frame/subframe index or by an initial offset of the configuration window. For instance, a discovery configuration's first discovery period could begin at frame #2, subframe #4 or 25 ms after the start of the configuration window.

The "duration" parameter is utilized to manage the duration of the discovery process and enable coordination between the UEs and eNBs. The discovery duration may be specified as a time duration or in terms of a number of subframes. A longer duration can accommodate a more robust discovery operation by giving UEs more time to transmit and listen for discovery beacons or signals. A shorter duration may be configured to improve power and processing efficiency of the UEs and may not result in significant performance degradations when the UEs participating in the discovery experience good channel conditions (such as when the UEs are all located relatively close to one another).

The "ID range" parameter can be used by the eNBs to configure blind or targeted discovery periods (explained in more detail below). For example, neighboring eNBs may desire to allocate non-overlapping discovery IDs to the UEs in the coverage areas of the respective cells in order to avoid interference or confusion during the discovery periods. Exchanging device ID ranges may also facilitate multi-cell discovery periods where UEs are configured to discover devices that may be served by different eNBs.

Different combinations of parameters, as well as the compositions of those parameters, fall within the scope of this disclosure. Specific parameters may be exchanged by utilizing a DPCM as noted above. A first example format of a DPCM using a bitmap for indicating the discovery period configuration is provided in Table 1.

TABLE 1

| Field (1 per configuration) | Description |
| --- | --- |
| Discovery Subframe Indices and Period | |
| Length 1000 bitmap | Indicates frames or subframes where D2D discovery periods are configured |
| Discovery duration | |
| 0-1 sec | Indicates maximum discovery period length |
| DRB/DRS map | |
| bitmap A bitmap B | 1 or 0 indicates whether or not the corresponding DRB or DRS is utilized for discovery |
| Discovery ID range | |
| 0-2048 | Indicates range of valid discovery IDs |
| Discovery Criteria Mapping (optional) | |
| See Table 3 | Indicates configuration index mapping for different sets of discovery feasibility criteria values |
| Discovery Configuration Mapping (optional) | |
| See Table 4 | Indicates configuration index mapping for different sets of discovery parameters values |

A second example format of a DPCM with multiple parameters for indicating the discovery period configuration is provided in Table 2.

TABLE 2

| Field (1 per configuration) | Description |
| --- | --- |
| SFN (optional) | |
| 0-100000 | Indicates starting SFN (in case SFN synchronicity cannot be assumed) |
| Discovery Period Initial Offset | |
| 0-999 | Indicates starting frame and/or subframe for the discovery period |
| Discovery period | |
| 0-999 | Indicates the time between discovery periods (relative to the start of the initial discovery period) |
| Discovery duration | |
| 0-1 sec | Indicates maximum discovery period length |
| Carrier Indication | |
| 0-15 | Indicates the carrier(s) for which the discovery configuration is valid |
| Bandwidth/Subframe Utilization | |
| 0-3 | Indicates whether DL/UL bandwidth (FDD) or subframes (TDD) are valid for the configuration, as well as any other deployment-specific configurations (such as if NCT or MBSFN subframes are used for discovery) Example configuration: 0—DL 1—UL 2—DL (NCT carriers only) 3—DL (MBSFN subframes only) |
| DRB/DRS map | |
| bitmap A bitmap B | 1 or 0 indicates whether or not the corresponding DRB or DRS is utilized for discovery |

TABLE 2-continued

| Field (1 per configuration) | Description |
|---|---|
| Discovery ID range | |
| 0-2048 | Indicates range of valid discovery IDs |
| Discovery Criteria Mapping (optional) | |
| See Table 3 | Indicates configuration index mapping for different sets of discovery feasibility criteria values |
| Discovery Configuration Mapping (optional) | |
| See Table 4 | Indicates configuration index mapping for different sets of discovery parameters values |

In some embodiments, one or more device criteria (such as battery power, discovery priority, or relative location) may be utilized in a device feasibility determination at an eNB. The one or more device criteria may also be used by an eNB to assist in determining a number of supported discovery parameter configurations. For example, an eNB may construct a mapping as shown in Table 3 below, where each discovery criteria index corresponds to a device discovery criterion (at least one of remaining batter power, discovery priority, and relative location).

TABLE 3

| | Device Discovery Criteria | | |
|---|---|---|---|
| Discovery Criteria Index | Battery Power (UE 115) | Discovery Priority | Relative location |
| 0 | <50% | 0 | <50 m |
| 1 | >50% | 0 | <50 m |
| 2 | <50% | 1 | <50 m |
| 3 | >50% | 1 | <50 m |
| 4 | <50% | 0 | <200 m |
| 5 | >50% | 0 | <200 m |
| 6 | <50% | 1 | <200 m |
| 7 | >50% | 1 | <200 m |

The device criteria mapping may be known at a UE, such as by using LTE standard definition or pre-configuration via higher-layer signaling. The device criteria mapping may also only be known at an eNB and can be transparent to a UE.

Additionally, a subset of discovery period parameters (to be defined later) may be mapped to a discovery configuration index such as is defined in Table 4 below. In this case, an eNB may transmit the configuration index to a UE, and the UE may determine the appropriate settings for the parameters based on the table. An example mapping is given in Table 4 below, where the discovery configuration index is coupled with at least one of transmit power level, discovery sequence length, and discovery timer.

The discovery timer can be utilized to manage the duration of the discovery process on a UE-specific basis and enable coordination between UEs and eNBs. The discovery timer may be specified as a time duration or in team of a number of subframes, where the discovery timer is less than or equal to the total discovery duration defined by the cell-specific discovery period configuration. A longer discovery timer can accommodate a more robust discovery operation by giving the UEs more time to transmit and listen for discovery beacons or signals. A shorter timer may be configured to improve power and processing efficiency of the UEs and may not result in significant performance degradations when the UEs participating in the discovery experience good channel conditions (such as when the UEs are all located relatively close to one another).

TABLE 4

| | Discovery Parameter | | |
|---|---|---|---|
| Discovery Config. Index | Transmit Power | Discovery Sequence Length (symbols/slots) | Discovery Timer ($T_{disc}$) |
| 0 | Tx Pwr Config. 0 | 8 | 5 ms |
| 1 | Tx Pwr Config. 1 | 8 | 5 ms |
| 2 | Tx Pwr Config. 0 | 16 | 10 ms |
| 3 | Tx Pwr Config. 1 | 16 | 10 ms |
| 4 | Tx Pwr Config. 0 | 32 | 10 ms |
| 5 | Tx Pwr Config. 1 | 32 | 10 ms |
| 6 | Tx Pwr Config. 0 | 32 | 20 ms |
| 7 | Tx Pwr Config. 1 | 32 | 20 ms |

In other embodiments, the configuration index may also be used to indicate a UE-specific starting offset for a UE to begin discovery transmission and reception (instead of an explicit indication of the subframes to be utilized). This UE-specific starting offset is different from the cell-specific starting offset, which may be configured by eNBs as part of a discovery resource set. An example mapping of discovery parameter configurations including UE-specific subframe offsets is given in Table 5.

Figure 8:
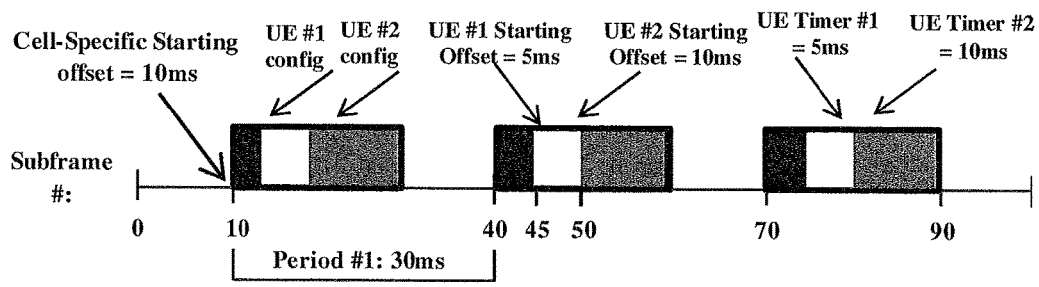
FIG. 8 illustrates an example discovery period with a cell-specific discovery offset and timers and with two UE-specific discovery offsets according to this disclosure.

FIG. 8 illustrates an example discovery period with a cell-specific discovery offset and timers and with two UE-specific discovery offsets according to this disclosure. As shown in FIG. 8, the cell-specific discovery period is 20 ms in duration. An eNB configures UE #1 with a UE-specific starting offset of 5 ms and a timer duration of 5 ms (Config #1 in Table 5), resulting in UE #1 utilizing only 25% of the total possible discovery period. The eNB also configures UE #2 with a UE-specific starting offset of 10 ms and a timer duration of 10 ms (Config #4 in Table 5), resulting in UE #2 utilizing 40% of the discovery period and having a non-overlapping discovery period with UE #1. The starting offset may be beneficial in order for a UE to save battery power and potentially reduce interference with other UEs if different configurations are non-overlapping (such as Config #2 and Config #4).

TABLE 5

| Discovery Config. Index | Discovery Parameter | | |
|---|---|---|---|
| | Transmit Power | Discovery Subframe Initial Offset | Discovery Timer ($T_{disc}$) |
| 0 | Tx Pwr Config. 0 | 5 | 5 ms |
| 1 | Tx Pwr Config. 1 | 5 | 5 ms |
| 2 | Tx Pwr Config. 0 | 0 | 10 ms |
| 3 | Tx Pwr Config. 1 | 0 | 10 ms |
| 4 | Tx Pwr Config. 0 | 10 | 10 ms |
| 5 | Tx Pwr Config. 1 | 10 | 10 ms |
| 6 | Tx Pwr Config. 0 | 0 | 20 ms |
| 7 | Tx Pwr Config. 1 | 0 | 20 ms |

The coordination between eNBs (such as eNBs 102-103) could occur in any suitable manner. The following are examples of the types of coordination that could occur.

(i) A set of fixed parameters can be exchanged between eNBs once, such as upon an initial system configuration (like during eNB installation).

(ii) A semi-static parameter configuration exchange can occur between eNBs via DPCM exchange, such as over an X2 or S1 interface. A fixed configuration period may be pre-defined or configured. For example, a set of mapped discovery parameters can be updated every hour to adapt to network conditions (more or fewer device discovery instances).

(iii) An on-demand parameter exchange can occur between eNBs, where one eNB initiates the DPCM exchange upon making a change to a parameter or a set of parameters. For example, upon experiencing a large increase in data traffic over a cellular air interface, an eNB can decide to reduce the number of discovery period opportunities. The eNB then informs its neighboring eNBs of its new selection of discovery subframe indices and period.

Discovery Request/Initiation

In step (2) of FIG. 5, a D2D discovery protocol between two UEs (such as UEs 114-115) is initiated. Several approaches are described below, including approaches where the D2D discovery protocol is network-initiated and other approaches where the discovery protocol is UE-initiated.

In a "network-initiated" approach, the discovery protocol may be initiated based upon a discovery trigger at an eNB, where the eNB configures UEs to engage in D2D discovery on a periodic or aperiodic basis depending on the value of the discovery trigger. The initiation of the discovery protocol may be done with the intent of updating a database at the eNB regarding the status and proximity of UEs inside and outside the network. This database may be used by the eNB to determine the feasibility of D2D discovery and/or communication.

When an eNB decides to periodically initiate the discovery protocol for a UE, the time-frequency resource associated with the trigger is configured by the network and indicates the period between discovery attempts (in teens of time units or subframes) and an initial subframe offset. The time-frequency resource associated with the periodic trigger may be explicitly indicated to the UE via a radio resource control (RRC) configuration message. The UE is expected to receive from the eNB a discovery feasibility message (explained in step (2) below) or a discovery setup message (explained in step (3) below) at the time or subframe instants indicated by the configuration.

In the case of an aperiodic discovery trigger, the value of the trigger may not be explicitly indicated to the UE. Rather, the UE could be able to receive a discovery feasibility message (DFM) or discovery setup message (DSM) in all subframes (without any restriction on the subframes). The DFM or DSM may be configured by the eNB to the UE based on an evaluation of one or more metrics, such as the volume of served data traffic, the knowledge or estimation of device proximity, or higher-layer signaling from the core network requesting device discovery. For example, in a public safety network, a command and control center monitoring an emergency response call may request to the network that certain UEs perform device discovery in order to initiate low-latency and high reliability D2D communications.

"UE-initiated" approaches consider scenarios where a UE initiates the discovery protocol. As shown in FIG. 5, a D2D discovery request (DR) may be sent from the UE 114 to the eNB 102 and/or from the UE 115 to the eNB 103. A D2D DR may indicate different discovery priority values. This allows a device or network to have greater flexibility in devoting time-frequency and power resources, which can match either the current radio conditions or the device usage scenario (such as higher priority for emergency data services over commercial data services). This discovery priority may be indicated to a UE by the network via higher-layer signaling or may be indicated on the UE by an interface to an application. Additionally, a UE may utilize a D2D DR to indicate to the network how many devices the UE wishes to discover, possibly along with their unique device identifiers, in order to assist the network in discovery resource configuration.

Since discovery IDs represent unique device identifiers that are used in the discovery process, the values and/or methods for generating discovery IDs may be coordinated across multiple eNBs. This allows the UEs connected to different eNBs to avoid collisions in terms of IDs. Various approaches for generating discovery IDs could be used. One example involves a combination of the physical cell identifier (PCI) of an eNB and the cell radio network temporary identifier (C-RNTI) of a UE (which is configured by its eNB). Another example involves using a new ID for a UE configured by an eNB for D2D communications (which can be configured independently of other RNTIs, such as C-RNTI). Yet another example involves an ID autonomously generated by a UE according to a predefined mechanism. If the discovery IDs or their expected ranges are explicitly known by neighboring eNBs, the determination of discovery feasibility and discovery resource allocations may be more efficiently handled for UEs that are not associated with a serving eNB.

In some embodiments, a decision to perform device discovery is based on an eNB receiving an indication from a UE via a D2D DR that the UE wishes to engage in device discovery. The transmission of the DR may be triggered by the UE, such as by an application indicating that it has data for another UE or that it wishes to receive data from another UE.

In other embodiments, a decision to perform device discovery is based on a configured discovery trigger, where a UE requests to engage in D2D discovery on a periodic or aperiodic basis. This is similar to the network-initiated approach, except that the trigger is configured at the UE and may be transparent to the eNB. The trigger could be determined by an application running on the UE or configured by the network via higher-layer signaling. One purpose of the trigger may be to update a database at the UE and/or eNB regarding the status and proximity of UEs in the network. This database may be used by the UE and/or eNB to determine the feasibility of D2D discovery and/or communication.

A network-signaled configuration for a periodic discovery trigger at a UE may identify an interval between discovery requests and a discovery backoff parameter. The discovery backoff parameter can indicate whether the UE should increase or decrease its discovery attempts, depending on the success or failure of D2D discovery protocol periods. In some embodiments, the UE may start a discovery backoff timer upon sending an initial discovery request, and the UE may send the next request no sooner than upon expiration of the timer with a duration indicated by the backoff parameter.

As one example, a UE may be configured to engage in discovery periods every second (or every 1,000 subframes). However, if the UE is not in close proximity to other UEs or if the configured discovery priority is lowered, the configured discovery periods may not be successful. The discovery backoff period may indicate to the UE that, after X=4 failed discovery periods (the value of X can be configured by the network and indicated to the UE via higher-layer signaling), the discovery period is increased by a factor Y=10 (meaning the effective discovery period is 10 seconds or 10,000 subframes). This backoff may be beneficial to reduce overhead in discovery period configurations between the UE and the network, such as in scenarios where the UE is periodically engaged in discovery even during periods when the UE is not in an RRC_connected state or synchronized with the network. As another example, when discovery is successful after X periods or the indicated discovery priority changes, the UE may instead increase the discovery period by a factor Y<1.

With respect to the "UE-initiated" approaches, various techniques can be used by a UE to transmit a D2D DR to an eNB. For example, a UE could transmit a scheduling request (SR) to an eNB requesting Physical Uplink Shared CHannel (PUSCH) scheduling, and a D2D DR can be transmitted on the subsequently-scheduled PUSCH. As a particular example, when a configured periodic or aperiodic discovery triggering occurs on a UE (such as by higher-layer application signaling), the UE sends an SR to the eNB using a Physical Uplink Control CHannel (PUCCH) format 1 message (if the eNB has not already scheduled uplink resources for the UE). In response, the eNB grants uplink resources (a PUSCH) for the UE via a Physical Downlink Control CHannel (PDCCH) downlink control information (DCI) format 0 message, and the UE sends a buffer status report (BSR) indicating the size and format of the D2D DR. The eNB uses the BSR to allocate sufficient PUSCH resources for the D2D DR and indicates this in another grant message via PDCCH. Upon receipt of the PUSCH grant, the UE transmits its D2D DR.

As another example, a UE could initiate a Random Access CHannel (RACH) procedure to transmit a D2D DR. For instance, assume a UE cannot utilize resources on uplink shared channels, such as when the UE is RRC connected but not time-synchronized or is recovering from radio link failure, and has a high discovery priority. The UE may utilize the RACH to send an SR to an eNB in an L2/L3 message included in the RACH procedure, with the remaining steps as described in the preceding paragraph.

As yet another example, a UE can send a D2D DR to an eNB on a PUCCH. For instance, in the case of a basic DR, the UE may utilize a PUCCH message and transmit a D2D DR without needing to request PUSCH transmission resources. This can help to reduce latency and overhead of the signaling.

Once a DR is received by an eNB, in the case of a targeted DR, the eNB may determine that at least one of the indicated UEs is located in an adjacent cell and may choose to share this information with the adjacent cell's eNB. For example, the eNB 102 may receive a DR from the UE 114 for targeted discovery of UE 115. In this case, the eNB 102 may exchange the DR (such as over X2) with the eNB 103 so that the eNB 103 may configure the UE 115 for discovery with the UE 114 (which may also entail sending a paging message if the UE 115 is currently in an RRC_IDLE state).

In the case of a blind discovery request, an eNB may not be able to determine directly if UEs in neighboring cells are able to participate in discovery with its own UE. However, the eNB can still inform neighboring eNBs of the discovery request, and the neighboring eNBs may choose whether or not to configure their own UEs to participate in the same discovery period. Also, positioning information can be taken from sources such as radio resource management (RRM) measurements of neighboring cells or global positioning system (GPS) or positioning reference signal (RS) measurements giving relative or exact position information. Based on the positioning information, an eNB may be able to determine the proximity of one or more UEs to engage in discovery with neighboring cells. Based on this location hypothesis, the eNB may determine a set of eNBs to exchange the DR information as having likely candidate UEs for discovery. Additionally, based on previous discovery attempts, the eNB may also determine a set of device IDs to forward to the other eNBs as indicated candidates for inclusion in the discovery period.

The exchange of discovery request-related information in step (2) of FIG. 5 may be accomplished via a Discovery Request Exchange Message. In some embodiments, this type of message may contain one, some, or all of the following parameters:

1. Device ID of the device requesting discovery
2. Discovery type
3. Discovery priority
4. Number of indicated device IDs
5. Device IDs for targeted discovery An example format for this type of message is shown in Table 6 below.

TABLE 6

| Field | Description |
| --- | --- |
| Request Source Device ID | |
| 10-bit field | Indicates the device ID where the request originated |
| Discovery Request Type | |
| 0 | Basic DR device IDs not indicated |
| 1 | Targeted DR - indicates device IDs for "targeted" discovery |
| 2 | Ad-Hoc Basic DR: blind ad-hoc discovery mode |
| 3 | Ad-Hoc Targeted DR: provides device IDs of out-of-coverage devices for targeted ad-hoc discovery |

TABLE 6-continued

| Field | Description |
| --- | --- |
| Discovery Priority | |
| 0 | Low priority |
| 1 | High priority |
| Number of indicated device IDs (optional) | |
| 1-8 | Gives the size of the Device ID fields |
| Device IDs (optional) | |
| Up to 8 10-bit values | Indicate 8 unique IDs (out of 1024 possible) |

Discovery Feasibility Measurement

In step (3) of FIG. 5, the eNBs 102-103 configure D2D discovery feasibility measurements (DFMs) between the UEs 114-115, respectively, and the UEs 114-115 then issue D2D DFM reports. A DFM determines what the context of a UE is (such as whether D2D is feasible between two UEs or not), and the DFM is used by the eNBs to determine whether a discovery period should be configured.

A DFM is optional, and an eNB may utilize other approaches, such as a legacy measurement reporting mechanism, as part of the assessment of device discovery feasibility. For example, an eNB may utilize legacy intra- and inter-frequency measurement configurations utilized in cell connection and handoff procedures, which are indicated to a UE by RRC signaling. An eNB may also use measurement reporting procedures utilized to transfer measurement results from a UE to an Evolved Universal Terrestrial Radio Access Network (E-UTRAN).

In step (3) of FIG. 5, the eNBs 102-103 may first check the RRC connectivity status (connected or idle) of the UEs 114-115. If one or both UEs are currently in an idle state, the appropriate eNB may use a paging message to "wake up" the associated UE.

The network uses stored information about UEs to configure the discovery period. The stored information may be used to first determine the feasibility of performing D2D discovery. The stored information may include at least one of battery power levels, relative locations, GPS location data or other location data (such as data obtained by positioning signal measurements between a UE and an eNB), device category, discovery priority, and type of data to be transmitted between UEs. For example, the eNBs 102-103 may use the most recent locations of the UEs 114-115 and their remaining battery powers to determine if the UEs are in proximity such that sufficient transmit power resources can be expended to complete the discovery process.

The eNBs 102-103 may periodically or aperiodically query the UEs 114-115 to obtain the necessary information for discovery configuration. The stored information may not be utilized due to the lack of said information (such as if the UEs have recently connected and have not yet provided data to the network). The stored information may also not be utilized if the information available is not current enough to be effectively utilized. If the network polls the UEs periodically to update the information, the network may wait until the next scheduled period or poll the UEs on an on-demand basis.

In order to query the UEs 114-115, the eNBs 102-103 may configure a discovery feasibility period for the UEs 114-115 and transmit DFM request messages to the UEs 114-115, such as via a downlink control channel. A DFM request message may indicate the time-frequency resources for obtaining a measurement RS from the eNB and time-frequency resources for reporting the measurement results. The time-frequency resources may be explicitly signaled in the measurement request message, or a UE may rely on a configuration of measurement parameters that are stored as a default or previously stored after being configured by higher-layer signaling.

Based on the received DFM request messages, the UEs 114-115 perform the desired measurement transmissions and receptions and prepare a DFM report message to send to their respective serving eNBs 102-103 on the configured time-frequency resources. A DFM report message may include GPS or other location data and/or sounding signal measurements between a UE and its associated eNB. The DFM report message may also include an indication of a desired discovery configuration index. Following the reception of the DFM report messages for the UEs 114-115, the eNBs 102-103 may update their stored information tables based on the relevant received parameters.

Once a DFM report message is received by an eNB, in the case of a targeted DR, the eNB may decide to share the results of the feasibility measurements and assessments with relevant neighboring eNBs. For example, the eNB 102 may receive a DFM report from the UE 114 indicating that the UE's location relative to the last measured location of the UE 115 has not changed since the last discovery period. This indicates that discovery may be likely to succeed. On the other hand, if the report from the UE 114 suggests that the UEs 114-115 may no longer be in sufficient proximity (such as due to a high mobility or a long duration since the last successful discovery), the eNB 102 may indicate to the eNB 103 that the eNB 102 will not proceed with discovery resource configuration.

In some embodiments, the DFM report message may include one, some, or all of the following parameters:
1. Source device ID
2. Reference signal received power (RSRP) measurements
3. Channel quality measurements
4. Location data
5. Battery power report
6. Discovery configuration recommendation An example format for the DFM report message is given in Table 7.

TABLE 7

| Field | Description |
| --- | --- |
| Request Source Device ID | |
| 10-bit field | Indicates the device ID where the request originated |
| RSRP measurements | |
| Measurement configured by Table 2 | Provides RSRP for the configured MRS |
| Channel quality measurements | |
| Measurement configured by Table 2 | Provides estimate of channel quality for the configured MRS |
| Location data | |
| 12-bit field | Location or differential location update |
| Battery power report | |
| 2-bit field | Maps to 4 different levels (>75%, >50%, >25%, >0%) |

TABLE 7-continued

| Field | Description |
| --- | --- |
| Discovery configuration recommendation | |
| 0-7 | Indicates one of 8 sets of discovery parameters |

Discovery Resource Configuration and Signaling

In step (4) of FIG. 5, the eNBs 102-103 determine and configure appropriate discovery resources and associated messages, and the eNBs transmit discovery setup information (such as via SIB or RRC signaling). Once the eNBs have determined the feasibility of a discovery setup and determined the relevant parameters, each eNB may configure a discovery setup message (DSM) to transmit to its UE(s). The DSM may include an indication of time-frequency resources for discovery, transmit power, discovery timer, discovery IDs, the number of devices to discover, and associated discovery priority.

As an example, the time-frequency resources utilized for discovery may be divided into discovery resource blocks (DRBs) or consecutive DRB groups (DRBGs) and explicitly or implicitly indicated by an eNB in a DSM. In the case of implicit indication, a UE may select a particular set of time-frequency resources already known at the UE (such as via a higher-layer configuration or set as a default). The selection at the UE may also be from mapping a configuration index transmitted by the eNB in the DSM to a set of time-frequency resources already known at the UE (such as via a higher-layer configuration or set as a default). The configuration index could be one of the indexes given in Table 4 above.

In the case of explicit indication, various approaches can be used. In one approach, a subset of individual DRB allocations within a set of DRBGs is indicated via a bitmap. A bit value of zero in the bitmap could indicate that the corresponding DRBG is not utilized for discovery. An additional bit field, the number of bits N, in a discovery resource configuration bitmap can be determined by the number of total discovery resource allocations allocated by the network. The bitmap A forms the bit sequence $a_{N-1}, \ldots, a_3, a_2, a_1, a_0$, where $a_0$ is the least significant bit (LSB) and $a_{N-1}$ is the most significant bit (MSB).

In another approach, time-frequency resource (DRB or DRBG) allocations are indicated via a one-to-one bitmap. A bit value of zero in the bitmap could indicate that the corresponding DRB or DRBG is not utilized for discovery. The number of bits in the discovery resource configuration bitmap N+1 can be determined by the number of total discovery resource allocations allocated by the network, along with an additional bit to signal the subset of DRBs within the DRBG. The bitmap A forms the bit sequence $a_N$, $a_{N-1}, \ldots a_3, a_2, a_1, a_0$, where $a_0$ is the LSB and $a_N$ is the MSB. The bit $a_N$ indicates which DRBs inside of the DRBG are utilized for discovery.

In yet another approach, a set of RBs or RBGs is indicated via an index of a starting DRB or DRBG and a length. The length could be expressed in terms of contiguously allocated RBs or RBGs.

In some embodiments, a subset of device criteria that may have been utilized in a UE feasibility determination can be used to define a number of supported scenarios for which different discovery configurations are utilized. An example mapping is given in Table 3. Additionally, a subset of discovery period parameters may be mapped to a discovery configuration index. Thus, an eNB may transmit the configuration index to a UE, and the UE may determine the appropriate settings for the parameters based on the table.

Part of the discovery process includes a UE searching and identifying discovery IDs of nearby UEs. Depending on the network configuration, several techniques may be used to search and identify the discovery IDs of nearby UEs. In a first technique, the network may explicitly indicate the candidate device IDs to search for as part of the configuration message or an index of a table mapping to a preconfigured discovery ID in order to reduce the size of the control message field. An explicit indication of the discovery IDs facilitates a "targeted" discovery protocol, where only a subset of specifically-identified UEs will be discovered (even if a larger set of UEs simultaneously participate in the discovery). Discovery signaling efficiency is one benefit of a targeted discovery since device IDs can be ignored if they are not in the set of those explicitly indicated and since the discovery protocol can be shortened by discontinuing reception of related discovery signaling. Also, if the discovery IDs of the indicated UEs are obtained by a UE before the expiration of a configured discovery timer, the UE may terminate the discovery signaling and preserve processing and transmit power resources. The amount of storage and processing resources can be reduced or minimized by configuring only those resources needed for the indicated number of UEs to be discovered.

In a second technique, discovery IDs are not explicitly signaled by an eNB. Instead, a number $N_d$ of UEs to be discovered by a specified UE is indicated in the message. Indicating the number of UEs facilitates a "blind" discovery protocol, which allows many UEs to perform discovery even if their discovery IDs are not known beforehand. This approach may be beneficial in scenarios where the network is not currently aware which UEs may be within a feasible discovery range of a targeted UE, either because the eNBs or network does not track that information or because currently-stored proximity information is determined to be out-of-date. However, the network may wish to limit a UE to discovery with only a few other UEs (such as the $N_d$ closest UEs) due to power efficiency, data resource scheduling, and bandwidth constraints. Once $N_d$ UEs have been discovered by a targeted UE, the targeted UE may discontinue discovery signaling and/or reception. This approach may also be beneficial in scenarios where some or all UEs within discovery range of a targeted UE are not currently connected to an eNB.

In a third technique, discovery IDs are again not explicitly signaled by an eNB. Instead, a range of discovery IDs that may be discovered by a UE is indicated in the message. For example, after determining that the UE 114 may be located in proximity to the eNB 103 serving the UE 115, the eNB 102 may indicate to the UE 114 that the UE 114 should perform discovery of IDs corresponding to the range of IDs allocated for the eNBs 102-103. If discovery ID allocation is based on PCI+C-RNTI, the eNB 102 may indicate the PCIs of the eNBs 102-102 to the UE 114 to use as the basis for determining a valid range of IDs.

The discovery configuration may be serving-cell specific, in which case the serving cell index (such as servCellIndex) is indicated along with the configuration parameters. For example, if a UE is configured with a discovery resource configuration along with servCellIndex=2, the UE can use a subset of the time-frequency resources configured by the discovery resource configuration in a serving cell of servCellIndex=2. As another example, if a UE in frame structure type 1 (FDD) is configured with a discovery resource configuration along with servCellIndex=2 and DiscoveryResourceULDL=UL, the UE can use a subset of the time-frequency resources configured by the discovery resource set configuration in a UL serving cell of servCellIndex=2. As a third example, if a UE in frame structure type 1 is configured in a serving cell with a discovery resource set configuration along with DiscoveryResourceULDL=UL, the UE can use a subset of the time-frequency resources configured by the discovery resource set configuration in a UL serving cell of the serving cell.

One useful feature of the network-assisted discovery protocol is the ability to inform an eNB regarding the success or failure of the discovery protocol and to provide feedback with regard to parameters relevant for future device discovery configurations. A discovery report message may be configured by an eNB or the network and indicated to a UE in a DSM. The report message configuration may include an indication of the time-frequency resources to be utilized for a report transmission, as well as an indication of relevant statistics or other information to be included in the report. The information elements to be included in the report may include the total elapsed discovery time, received signal power of discovery beacons or signals, channel quality measurements or estimates, relative or exact location information, detected device IDs, and any higher-layer context information that may be exchanged as part of the discovery process. Additionally, the discovery report configuration may indicate which device(s) will transmit the discovery report for a given discovery period.

Once discovery resource parameters are configured and a DSM is prepared by an eNB, the eNB may decide to share the configuration with relevant neighboring eNBs in the case of a targeted DR. For example, the eNB 102 may configure a DSM for the UE 114, indicating that the UE 114 should use discovery resource configuration 8 and device ID 1000, which corresponds to the device ID of the UE 115. When the eNB 102 indicates to the eNB 103 the DSM for the UE 114, the eNB 103 may configure the UE 115 with discovery configuration 8 and device ID 900, which corresponds to the UE 114. In this case, both UEs will have a common discovery parameter configuration to improve discovery performance, even though they are served by different eNBs.

The exchange of discovery configuration parameters may be accomplished using a Discovery Configuration Exchange Message (DCEM). The DCEM may include one or more parameters in the DSM transmitted to a UE. In some embodiments, the DCEM could include one, some, or all of the following parameters:
1. Device ID of the discovery requesting device
2. Discovery setup type
3. Discovery configuration index
4. Transmit power
5. Discovery sequence length
6. Discovery timer
7. Number of devices to discover
8. Device IDs to discover
9. Device ID range
10. Serving cell index
11. DL/UL bandwidth indication
12. Total number of DRBs (N)
13. Total number of DRSs (T)
14. DRB/DRS maps
15. Sync Signal Indication
16. Virtual cell identifier (VCID)
17. Sync Signal Configuration Index An example of a configured DCEM is given in Table 8 based on these parameters.

TABLE 8

| Field | Description |
|---|---|
| Request Source Device ID | |
| 10-bit field | Indicates the device ID where the request originated |
| Discovery Setup Type | |
| 0 | Indicates "blind discovery" |
| 1 | Indicates "targeted discovery" |
| Discovery Configuration Index | |
| 0-7 | See Table 5 |
| Number of indicated discovery IDs $N_d$ (optional, used for blind discovery) | |
| 1-8 | Gives the size of the Discovery ID fields |
| Discovery IDs (optional, used for targeted discovery) | |
| Up to 8 10-bit values | Indicate 8 unique IDs (out of 2048 possible) |
| Discovery ID range (optional, used for blind discovery) | |
| 0-2048 | Indicates range of valid discovery IDs |
| Total number of DRBs (N) (optional) | |
| 1-100 | Indicates maximum number of DRBs per discovery period |
| Total number of DRSs (T) (optional) | |
| 1-100 | Indicates maximum number of DRSs per discovery period |
| DRB/DRS maps | |
| bitmap A bitmap B | 0 or 1 indicates whether or not the corresponding DRB or DRS is utilized for discovery |

TABLE 8-continued

| Field | Description |
|---|---|
| Sync Signal Indication | |
| 0 or 1 | Indicates if UE transmitted sync signal is configured (0—off, 1—on) |
| VCID (optional) | |
| 0-503 | Indicates the virtual cell ID to generate the synchronization signal |
| Sync Signal Configuration Index (optional) | |
| 0-3 | Indicates time/frequency/power parameters/sync signal sequence ID to use as part of ad-hoc discovery |

Another example of a configured DCEM is given in Table 9, where the previously-described parameters mapped to a discovery configuration index are configured by separate fields in the DCEM.

TABLE 9

| Field | Description |
|---|---|
| Request Source Device ID | |
| 10-bit field | Indicates the device ID where the request originated |
| Discovery Setup Type | |
| 0 | Indicates "blind discovery" |
| 1 | Indicates "targeted discovery" |
| Transmit Power | |
| 0-3 | Indicates Tx Pwr Config. to use for discovery |
| Discovery sequence length | |
| {4, 8, 16, 32, 64} | Indicates the number of symbols or slots used in discovery Tx/Rx |
| Discovery Timer | |
| 0-100 ms | Indicates maximum length of time the UE performs discovery Tx/Rx per discovery period |
| Number of indicated discovery IDs $N_d$ (optional - for Alt 2-1 blind discovery) | |
| 1-8 | Gives the size of the Discovery ID fields |
| Discovery IDs (optional, for targeted discovery) | |
| Up to 8 8-bit values | Indicate 8 unique IDs (out of 256 possible) |
| Discovery ID range (optional, for blind discovery) | |
| 0-2048 | Indicates range of valid discovery IDs |
| Serving Cell Indication | |
| servCellIndex | Indication of which serving cell for which the discovery resources are configured |
| DL/UL Bandwidth indication (FDD) | |
| DiscoveryResourceULDL | Indicates whether resources correspond to UL or DL bandwidth |
| Total number of DRBs (N) (optional) | |
| 1-100 | Indicates maximum number of DRBs per discovery period |
| Total number of DRSs (T) (optional) | |
| 1-100 | Indicates maximum number of DRSs per discovery period |
| DRB/DRS maps | |
| bitmap A | 0 or 1 indicates whether or not the corresponding DRB or DRS is utilized for discovery |
| bitmap B | |
| Sync Signal Indication | |
| 0 or 1 | Indicates if UE transmitted sync signal is configured (0—off, 1—on) |

TABLE 9-continued

| Field | Description |
| --- | --- |
| VCID (optional) | |
| 0-503 | Indicates the virtual cell ID to generate the synchronization signal |
| Sync Signal Configuration Index (optional) | |
| 0-3 | Indicates time/frequency/power parameters/sync signal sequence ID to use as part of ad-hoc discovery |

After a DSM is determined by an eNB, the DSM is transmitted, such as via a downlink control message that may be configured on a periodic or aperiodic basis. In some embodiments, a DCI configuring a Physical Downlink Shared CHannel (PDSCH) to carry the DSM is transmitted to $U_T$ and $U_R$ in a UE-specific search space of PDCCH/ePDCCH. In this case, control channel elements (CCEs) or enhanced CCEs (eCCEs) for the different UEs are orthogonal. In other embodiments, a DCI configuring the PDSCH to carry the DSM is transmitted to $U_T$ and $U_R$ in a common search space of PDCCH/ePDCCH. In cases where multiple UEs are engaged in discovery with the same set or subset of UEs, redundancy can be removed and decoding complexity can be reduced as the DSMs are multicast to $U_T$ and $U_R$ in the same downlink resources.

In yet other embodiments, certain parts of the DSM are transmitted in a UE-specific manner, and other parts of the DSM are multicast as a common control message. For example, the discovery setup type and discovery configuration index fields may be multicast to all UEs if an eNB determines that these parameters are shared in common. Whatever the number of indicated device IDs, the device IDs can be transmitted in a UE-specific manner since an eNB may wish to restrict UEs to only discover a subset of all UEs participating in the discovery period. Additionally, DRB/DRBG mappings can be transmitted in a UE-specific manner since they may be orthogonally assigned to each UE. As another example, the number of device IDs and the device IDs themselves can be transmitted as part of the common DSM instead of on a UE-specific basis. This may be beneficial to reduce DSM overhead if a large number of UEs are to engage in discovery without restriction.

D2D Discovery Protocol

In step (5) of FIG. 5, the UEs 114-115 engage in a device discovery method based on the received discovery setup information. This step can include a discovery period during which discovery signals are exchanged amongst the UEs. This step can also include the assessments of measurements and other data collected during the discovery period.

At the conclusion of the discovery period, the UEs 114-115 determine the outcome of the discovery process. This may include determining whether unique device identifiers (which may be the same as the discovery IDs) are received, measuring physical layer parameters (such as estimates of channel quality between detected UEs), and identifying relative or exact location information. Furthermore, messaging may be included as part of the discovery process, where UEs exchange higher-layer information (such as data buffer statuses, quality of service levels, device capabilities, active applications, and user contexts). These higher-layer parameters may be used to determine if the discovery process is successful (instead of or in addition to physical layer thresholds).

The status of each discovery attempt may be indicated via a bitmap. A bit value of zero in the $i^{th}$ bit of the bitmap can indicate that the discovery attempt corresponding to the $i^{th}$ device ID as configured by the discovery setup was not successful. An additional bit field, the number of bits, in the discovery resource configuration bitmap can be denoted as $N_d$. The bitmap B forms the bit sequence $b_{Nd-1}, \ldots, b_3, b_2, b_1, b_0$, where $b_0$ is the LSB and $b_{Nd-1}$ is the MSB.

Discovery Report Messaging

In step (6) of FIG. 5, upon determination of a successful or failed device discovery, a discovery report message is transmitted by the UEs 114-115 to the eNBs 102-103, respectively, such as via an uplink control channel. In some embodiments, only one UE may transmit a device discovery report. The transmitting UE may be configured by a downlink discovery report configuration message or be set as default. For example, a UE with data to transmit following discovery (such as the UE 114) may be the default device to transmit a report. In other embodiments, multiple UEs (such as all UEs) can transmit device discovery reports, such as by utilizing received downlink control messages containing the device report configuration.

Upon receipt of one or more discovery reports, the eNBs 102-103 or the network can use the report(s) to update one or more related D2D databases. A discovery report may also be used by an eNB 102-103 or the network to determine optimal or desired D2D communication resources for the discovered devices.

Once a discovery report is received by an eNB, in the case of a targeted discovery, the eNB may decide whether to share the report with relevant neighboring eNBs. For example, the eNB 102 may receive a report from the UE 114 indicating that the UE 114 successfully discovered device ID 1000, which corresponds to the device ID of the UE 115, with an RSRP of −90 dBm after 5 ms of the 10 ms discovery period. When the eNB 102 indicates to the eNB 103 the results of the report from the UE 114, the eNB 103 may compare that with the report from the UE 115 indicating that discovery was not successful for a device ID 900, which corresponds to the UE 114. In this case, the eNB 103 may decide to reconfigure the UE 115 with a new discovery configuration having a higher discovery priority for the next discovery period.

The exchange of discovery configuration parameters may be accomplished using a Discovery Report Exchange Message (DREM). In some embodiments, the DREM may include one, some, or all of the following parameters:

1. Targeted discovery Result
2. Blind discovery result
3. Discovery channel quality measurements 4. Estimate of relative device locations
5. Discovery time elapsed An example of a DREM is given in Table 10.

TABLE 10

| Field | Description |
| --- | --- |
| Request Source Device ID | |
| 10-bit field | Indicates the device ID where the request originated |
| Targeted Discovery Result (optional) | |
| Bitmap B | $b_i$ indicates whether or not the discovery signaling with the corresponding discovery ID succeeded |
| Blind Discovery Result | |
| $N_d$ 10-bit fields | Field values: Value of 0 indicates failed discovery Value of discovery ID if success |
| Channel quality | |
| # of measurements configured by $N_d$ | Provides estimate of channel quality for each of the discovery attempts |
| Est. relative locations | |
| # of measurements configured by $N_d$ | Provides estimate of relative location for each discovery ID |
| Discovery Time | |
| $0$-$T_{disc}$ | Indicates total time needed for discovery (up to maximum $T_{disc}$) |

To reduce the amount of signaling and data traffic exchange between eNBs (such as in cases where many proximal devices are simultaneously engaged in discovery), discovery reports may be aggregated for multiple UEs and/or multiple discovery periods. In this case, a discovery report exchange summary message may be transmitted at fixed or configurable intervals. The number of aggregated devices or periods may also be fixed or configurable. For example, discovery for devices 0-7 may be configured for a first discovery period, and discovery for devices 8-15 may be configured for a second discovery period. After the two discovery periods are completed, the results of both discovery periods can be aggregated into a single report for all devices, removing redundant information (such as if all devices discovered each other except for device 0).

An example format of a discovery report summary message aggregating for multiple devices and periods is as follows.

```
DiscoveryReportSummary = {
    Number of source devices
    Number of discovery periods
    Source Device IDs
    Discovery Result
}
where:
    Targeted Discovery Result ={
        Number of discovered Device IDs: 0-15
        1. Discovered Device IDs (optional if 2 is present)
            10-bit field per Device ID
        2. Bitmap corresponding to Device IDs (optional if 1
            is present): 0 (failed discovery),
            1 (successful discovery)
    }
```

Once the discovery protocol is completed, the network or UEs may determine whether to proceed with a D2D or cellular communications protocol or, in cases of discovery failure, reinitiate a D2D discovery or cellular communications protocol. The eNBs may allocate dedicated resources to UEs for the purpose of D2D communications, or the UEs may autonomously negotiate between themselves to determine a set of resources. In the case of eNB-allocated resources, the eNBs may utilize similar mechanisms as for the discovery parameter exchange to determine valid D2D communication resource configurations for multi-cell communications.

Figure 9:
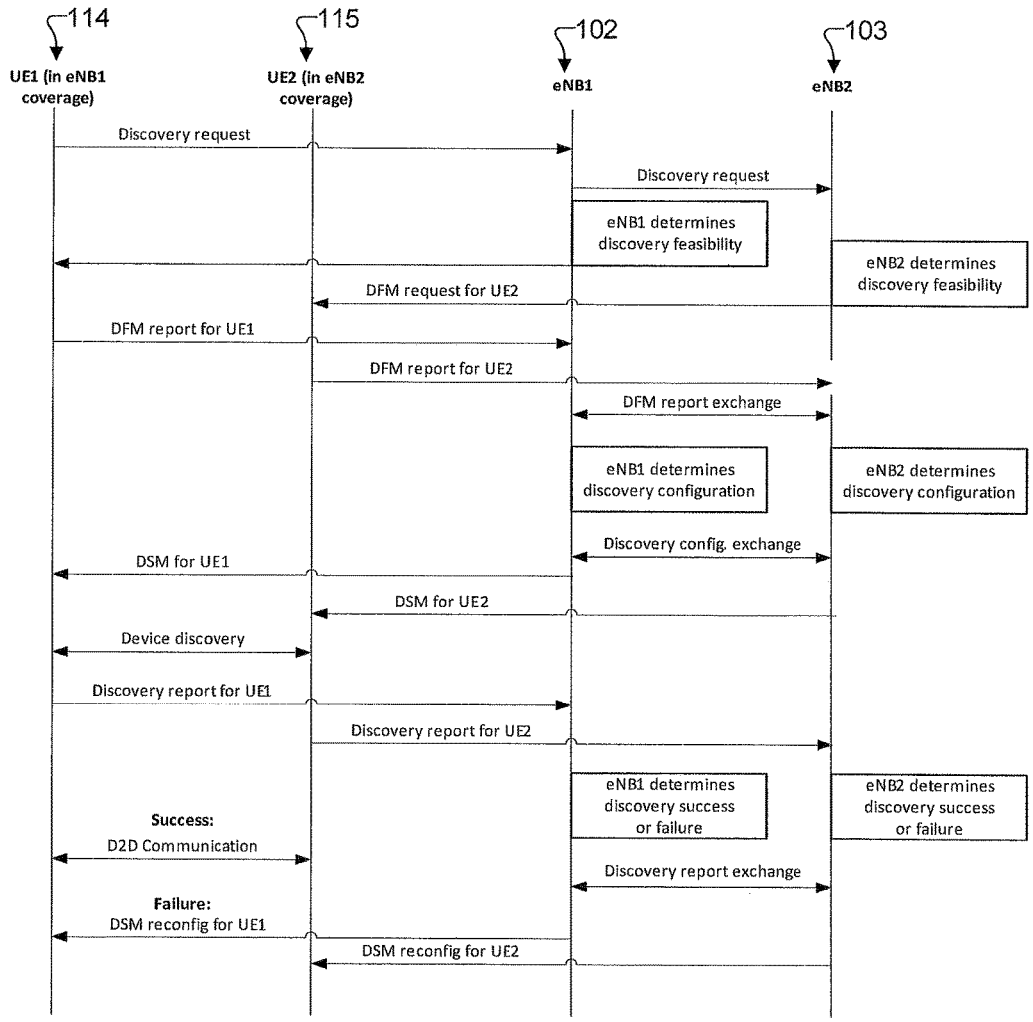
FIG. 9 illustrates an example signaling flow of a device discovery protocol when a UE initiates device discovery according to this disclosure.

FIG. 9 illustrates an example signaling flow of the device discovery protocol when a UE initiates device discovery according to this disclosure. In this particular example, the device discovery process is initiated by UE1 (such as UE 114), and the signaling shown in FIG. 9 supports the technique shown in FIG. 5 and the various steps described above.

As shown in FIG. 9, the UE 114 initiates the discovery process by sending a discovery request message to its eNB 102. The eNB 102 forwards the request to the eNB 103, and the eNBs 102-103 determine whether discovery is feasible. Assuming discovery is feasible, the eNBs 102-103 send DFM requests to the UEs 114-115, which respond with DFM reports that the eNBs 102-103 can exchange. The eNBs 102-103 determine the configuration of the discovery process amongst themselves, and DSM messages are sent to the UEs 114-115 identifying the configuration. The UEs 114-115 perform device discovery in accordance with the configuration, such as by transmitting and receiving discovery signals, to identify nearby UEs. The UEs 114-115 report the results of the device discovery to the eNBs 102-103, which determine whether or not the results were successful (such as by seeing whether the UEs 114-115 identified each other). If successful, the UEs 114-115 could then engage in D2D communications. If unsuccessful, the eNBs 102-103 could reconfigure the UEs 114-115 to perform discovery during a subsequent discovery period.

Although FIGS. 4 through 9 have illustrated various details of a network-assisted device discovery protocol that can be used by UEs served by different eNBs, various changes may be made to FIGS. 4 through 9. For example, any suitable number of UEs can participate in the discovery process. Also, while various approaches have been described above for each step of the device discovery process, each step of the discovery process could be implemented in any suitable manner.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

None of the description in this application should be read as implying that any particular element, step, or function is an essential element that must be included in the claim scope: the scope of patented subject matter is defined only by the claims. Moreover, none of these claims is intended to invoke paragraph six of 35 USC §112 unless the exact words "means for" are followed by a participle.

What is claimed is:
1. A method comprising:
    determining, by a first eNodeB (eNB) associated with a first cell of a network, that a first user equipment (UE) is to engage in a multi-cell device discovery process;

coordinating parameters of the multi-cell device discovery process with a second eNB, the second eNB associated with a second cell of the network and with a second UE, the parameters defining one or more resources to be used in the first and second cells during the multi-cell device discovery process, wherein the parameters of the multi-cell device discovery process further comprise a discovery period over which one or more resources are allocated for discovery message transmission or reception and a discovery timer to be used by the first UE; and communicating at least some of the parameters to the first UE, wherein the multi-cell device discovery process comprises a process in which the first UE identifies one or more other UEs served by the second eNB with which the first UE is able to engage in device-to-device communications while maintaining communications with the first eNB.

2. The method of claim 1, further comprising:
receiving, at the first eNB, results of the multi-cell device discovery process from the first UE;
determining whether the results indicate that the first UE detected the second UE during the multi-cell device discovery process;
receiving information from the second eNB indicating whether the second UE detected the first UE during the multi-cell device discovery process; and
if one of the UEs failed to detect one or more other UEs during the multi-cell device discovery process, communicating one or more updated parameters to the first UE.

3. The method of claim 1, wherein determining that the first UE is to engage in the multi-cell device discovery process comprises at least one of:
using a trigger indication configured on a periodic or aperiodic basis; or
receiving a discovery request from the first UE indicating a request to engage in the multi-cell device discovery process with one or more other UEs served by the second eNB.

4. The method of claim 1, wherein communicating at least some of the parameters to the first UE comprises communicating at least one of:
one or more network-common parameters;
one or more cell-specific parameters; or
one or more UE-specific parameters.

5. The method of claim 1, wherein the parameters of the multi-cell device discovery process comprise time-frequency resources to be used by the first UE, discovery identifier generation parameters, and a transmit power to be used by the first UE.

6. The method of claim 1, wherein the parameters of the multi-cell device discovery process comprise at least one of:
a number of devices to be discovered by the first UE; or
one or more identifiers of one or more specific devices to be discovered by the first UE.

7. The method of claim 1, wherein coordinating the parameters of the multi-cell device discovery process with the second eNB comprises communicating at least some of the parameters from the first eNB to the second eNB so that the second eNB is able to configure the second UE for the multi-cell device discovery process.

8. The method of claim 1, further comprising:
receiving, at the first eNB, results of the multi-cell device discovery process from the first UE; and
communicating the results of the multi-cell device discovery process to the second eNB.

9. An apparatus comprising:
a first eNodeB (eNB) configured to be associated with a first cell of a network, the first eNB comprising:
at least one transceiver configured to communicate with a first user equipment (UE) that is to engage in a multi-cell device discovery process and a second eNB that is associated with a second cell of the network and with a second UE; and
at least one processing device configured to:
coordinate parameters of the multi-cell device discovery process with the second eNB, the parameters defining one or more resources to be used in the first and second cells during the multi-cell device discovery process, wherein the parameters of the multi-cell device discovery process further comprise a discovery period over which one or more resources are allocated for discovery message transmission or reception and a discovery timer to be used by the first UE;
initiate communication of at least some of the parameters to the first UE via the at least one transceiver; and
receive a discovery request from the first UE indicating a request to engage in the multi-cell device discovery process with one or more other UEs served by the second eNB.

10. The apparatus of claim 9, wherein the at least one processing device is further configured to:
receive results of the multi-cell device discovery process from the first UE;
determine whether the results indicate that the first UE detected the second UE during the multi-cell device discovery process;
receive information from the second eNB indicating whether the second UE detected the first UE during the multi-cell device discovery process; and
if one of the UEs failed to detect one or more other UEs during the multi-cell device discovery process, initiate communication of one or more updated parameters to the first UE.

11. The apparatus of claim 9, wherein the at least one processing device is further configured to process a trigger indication configured on a periodic or aperiodic basis.

12. The apparatus of claim 9, wherein the parameters of the multi-cell device discovery process comprise time-frequency resources to be used by the first UE, discovery identifier generation parameters, and a transmit power to be used by the first UE.

13. The apparatus of claim 9, wherein the parameters of the multi-cell device discovery process comprise at least one of:
a number of devices to be discovered by the first UE; or
one or more identifiers of one or more specific devices to be discovered by the first UE.

14. The apparatus of claim 9, wherein the at least one processing device is further configured to at least one of:
initiate communication of results of the multi-cell device discovery process to the second eNB; and
receive results of the multi-cell device discovery process from the second eNB.

15. The apparatus of claim 9, wherein:
the parameters of the multi-cell device discovery process are defined by one of multiple discovery resource sets; and
the at least one processing device is configured to assign one of the multiple discovery resource sets to the first UE on a cell-specific or UE-specific basis.

16. An apparatus comprising:
a first user equipment (UE) configured to communicate with a first eNodeB (eNB) associated with a first cell of a network, the first UE comprising:
at least one transceiver configured to receive one or more parameters associated with a multi-cell device discovery process from the first eNB, the one or more parameters defining one or more resources to be used during the multi-cell device discovery process in the first cell and in a second cell associated with a second eNB, wherein the parameters of the multi-cell device discovery process further comprise a discovery period over which one or more resources are allocated for discovery message transmission or reception and a discovery timer to be used by the first UE; and
at least one processing device configured to identify one or more other UEs served by the second eNB based on communications received via the at least one transceiver during the multi-cell device discovery process.

17. The apparatus of claim 16, wherein:
the transceiver is configured to receive different sets of parameters associated with different occurrences of the multi-cell device discovery process from the first eNB, each set of parameters associated with a different discovery configuration to be used by the first UE; and
the at least one processing device is configured to use each set of parameters during a corresponding occurrence of the multi-cell device discovery process.

18. The apparatus of claim 17, wherein the different sets of parameters are associated with different sets of resources in the first and second cells.

19. The apparatus of claim 16, wherein the at least one processing device is further configured to:
process a trigger indication configured on a periodic or aperiodic basis; and
receive a discovery request from the first UE indicating a request to engage in the multi-cell device discovery process with one or more other UEs served by the second eNB.

20. The apparatus of claim 16, wherein the at least one processing device is further configured to initiate communication of results of the multi-cell device discovery process to the first eNB.

* * * * *